US007726963B2

(12) United States Patent
Nakano et al.

(10) Patent No.: US 7,726,963 B2
(45) Date of Patent: Jun. 1, 2010

(54) SOAP-MOLDING DIE

(75) Inventors: Takashi Nakano, Tochigi (JP); Shinji Kodama, Tochigi (JP)

(73) Assignee: Kao Corporation, Tokyo (JP)

( * ) Notice: Subject to any disclaimer, the term of this patent is extended or adjusted under 35 U.S.C. 154(b) by 977 days.

(21) Appl. No.: 10/552,370

(22) PCT Filed: Apr. 1, 2004

(86) PCT No.: PCT/JP2004/004807

§ 371 (c)(1),
(2), (4) Date: Jul. 26, 2006

(87) PCT Pub. No.: WO2004/090087

PCT Pub. Date: Oct. 21, 2004

(65) Prior Publication Data

US 2007/0132148 A1 Jun. 14, 2007

(30) Foreign Application Priority Data

Apr. 8, 2003 (JP) ............................ 2003-104582
Apr. 8, 2003 (JP) ............................ 2003-104584

(51) Int. Cl.
*B29C 45/00* (2006.01)

(52) U.S. Cl. .................... 425/348 S; 425/564; 425/571

(58) Field of Classification Search .............. 425/348 S, 425/564, 571, 557
See application file for complete search history.

(56) References Cited

U.S. PATENT DOCUMENTS 174,365 A * 3/1876 Jackson ...................... 425/233
2,975,485 A * 3/1961 Wendt ........................ 425/398
4,178,003 A * 12/1979 Hobson ............... 425/DIG. 42
4,389,365 A * 6/1983 Kudriavetz .................. 425/233
5,840,351 A * 11/1998 Inoue et al. ............. 425/436 R
7,037,885 B2 * 5/2006 Shimada et al. ............. 264/325
7,326,379 B2 * 2/2008 Hasegawa et al. ........... 425/564

FOREIGN PATENT DOCUMENTS

EP 1 239 027 A1 9/2002
JP 8-127800 5/1996
JP 11-34079 2/1999
JP 11-043699 2/1999

(Continued)

*Primary Examiner*—Richard Crispino
*Assistant Examiner*—Thu Khanh T Nguyen
(74) *Attorney, Agent, or Firm*—Oblon, Spivak, McClelland, Maier & Neustadt, L.L.P.

(57) ABSTRACT

Disclosed is a soap making split mold composed of a set of splits 1A and 1B adapted to be assembled together to form a molding cavity 1C. The split 1A has a larger surface area in its recess 11A defining part of the cavity 1C than the other split 1B does in its recess 11B defining the other part of the cavity 1C. The ratio of the surface area of the recess 11A of the split 1A to that of the recess 11B of the split 1B ranges from 52:48 to 66:34. Otherwise, the split 1A has a larger surface roughness Ra in its recess 11A defining part of the cavity than the other split 1B does in its recess 11B defining the other part of the cavity. The difference of the surface roughness Ra between the recess 11A and that of the recess 11B is 0.1 to 30 μm.

14 Claims, 2 Drawing Sheets

FOREIGN PATENT DOCUMENTS

| | | | |
|---|---|---|---|
| JP | 2001-525881 | | 12/2001 |
| JP | 2002-121599 | * | 4/2002 |
| JP | 2002-167597 | | 6/2002 |
| JP | 2002-167598 | | 6/2002 |
| JP | 2002-167599 | | 6/2002 |
| JP | 2003-129096 | | 5/2003 |
| JP | 2003-277798 | | 10/2003 |
| JP | 2003-277799 | | 10/2003 |
| JP | 2004-2717 | | 1/2004 |

* cited by examiner

SOAP-MOLDING DIE

TECHNICAL FIELD

The present invention relates to a mold for making soap bars.

BACKGROUND ART

Applicant has previously proposed a method of producing aerated soap which does not invite defects such as chipping on removal from the mold thereby to provide soap bars with an excellent appearance (see JP-A-2002-121599). The method comprises cooling and solidifying molten soap poured into a mold until the soap surface temperature falls to 5° to 30° C., elevating the temperature of the solidified soap until the surface temperature becomes higher by 2° to 15° C. than the surface temperature at the end of the cooling, and removing the soap bar from the mold. The mold used in the method has a surface roughness Ra of 0.1 to 30 μm on its inner side.

The method allows for successful removal from the mold even though the soap is more liable to chipping than ordinary soap because of air bubbles. At mold opening, however, the solidified soap bar tends to fall without being secured to a split of the mold. The soap bar very easily breaks up if dropped, which results in contamination of the production equipment. A soap bar should therefore be held in a split without fail. Apart from that issue, which split a soap bar holds to when the mold is opened tends to differ from cycle to cycle. This means that the step of removal from the mold with a handling unit tends to be complicated, which can reduce the productivity.

It has been proposed to apply a coating providing different releasability to the recess of a split of a mold so that adhesion of soap may differ between splits (see JP-T-2001-525881). However, the coating gradually comes off with the number of shots, eventually resulting in no difference in adhesion. It is therefore necessary to apply the coating to the split periodically, which makes the molding operation complicated and increases the production cost.

DISCLOSURE OF THE INVENTION

The present invention provides a soap making split mold composed of a set of pieces, called splits, that are adapted to be assembled together to form a molding cavity in the inside of the split mold. One of the splits has a larger surface area in the recess thereof defining part of the cavity than any of the other splits has in their recess defining other part of the cavity. The ratio of the surface area of the recess of the first-mentioned split to that of any of the other splits ranges from 52:48 to 66:34.

The present invention also provides a soap making split mold composed of a set of splits that are adapted to be assembled together to form a molding cavity in the inside of the split mold. One of the splits has a higher surface roughness Ra in the recess thereof defining part of the cavity than any of the other splits has in their recess defining other part of the cavity. The difference of the surface roughness Ra between the recess of the first-mentioned split and that of any of the other splits is 0.1 to 30 μm.

The present invention also provides a method of producing a bar of soap including the steps of injecting molten soap under pressure into the cavity of the above-described mold, cooling and solidifying the molten soap under compression, opening the mold, and removing the solidified soap from the mold.

DETAILED DESCRIPTION OF THE DRAWINGS

The present invention relates to a split mold for making a soap bar that is designed to always hold a molded soap bar in a specific split thereof when opened.

Figure 1:
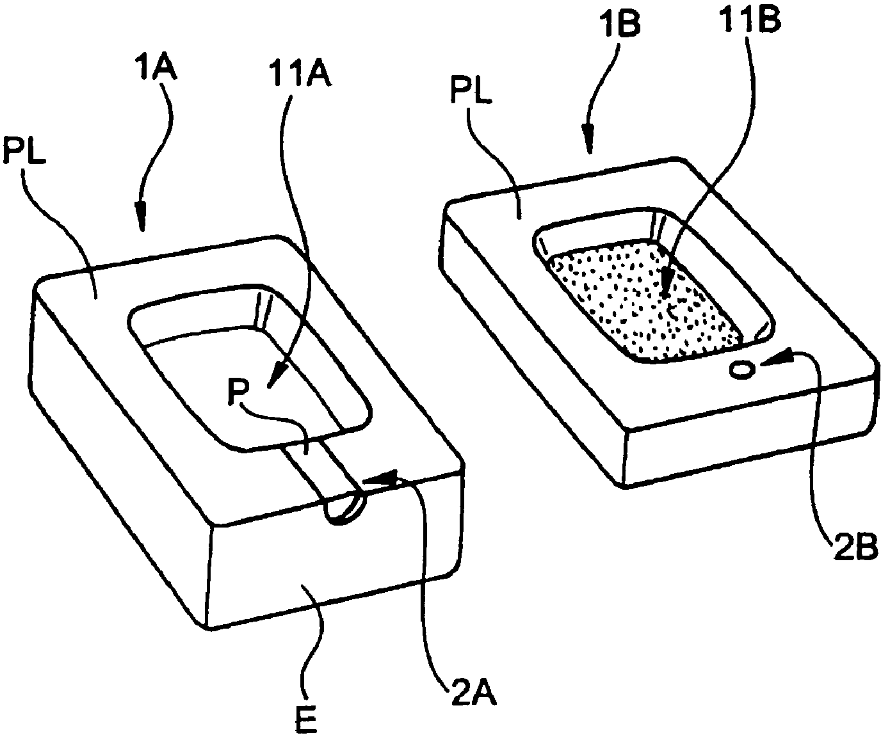
FIG. 1 is a perspective of an embodiment of a soap mold according to the present invention.

The present invention will be described based on its preferred embodiments with reference to the accompanying drawings. The soap mold illustrated in FIG. 1 is composed of a set of two splits, a first split 1A and a second split 1B. Each split has a rectangular block shape made of a rigid body, such as metal, with a recess 11A or 11B in its central portion. The recesses 11A and 11B are each shaped to define a cavity (not shown) in agreement with the contour of a soap bar to be produced when the first split 1A and the second split 1B are joined together on their parting faces PL. The recess 11A and 11B are asymmetrical. More specifically, the recess 11A of the first split 1A is larger than the recess 11B of the second split 1B. Neither of the recesses 11A and 11B has an undercut.

The second split 1B has a nozzle insert port 2B which pierces the second split 1B in the thickness direction on the periphery of the recess 11B. The diameter of the nozzle insert port 2B increases gradually from the parting face PL toward the back side of the second split 1B. The first split 1A has a half-columnar gate 2A engraved on part of its parting face PL. The gate 2A connects the recess 11A and the end face E of the first split 1A. A gate pin P whose contour is the same as the inner shape of the gate 2A is slidably inserted in the gate 2A. The gate pin P is made of metal, plastic, etc. The nozzle insert port 2B and the gate 2A are made in the respective splits in such a configuration that the gate 2A connects the nozzle insert port 2B and the cavity when the first and the second splits 1A and 1B are butted together on their parting faces PL. While not shown in the Figure, the second split 1B has an air vent on its parting face PL. While not shown, a passageway for cooling water circulation is provided in the blocks making the splits 1A and 1B.

As stated, the recess 11A of the first split 1A and the recess 11B of the second split 1B are asymmetrical, the former being bigger than the latter. Therefore, the surface area of the recess 11A of the first split 1A is larger than that of the recess 11B of the second split 1B.

As a result of study, the present inventors have found that, where the surface area of the recess 11A of the first split 1A is larger than that of the recess 11B of the second split 1B, a soap bar obtained by filling the cavity with molten soap and cooling the molten soap to solidify is always held in the first split 1A when the split mold is opened.

As the difference of surface area between the recess 11A of the first split 1A and the recess 11B of the second split 1B increases, the soap is more easily held in the recess 11A of the first split 1A. The present inventors have revealed, nevertheless, that the soap securely holds to the first split 1A with a small difference in surface area between the two recesses 11A and 11B. If the surface area of the recess 11A of the first split 1A is made excessively larger than that of the recess 11B of the second split 1B, the recess 11A of the first split 1A and the recess 11B of the second split 1B will noticeably differ in shape. Consequently, the obtained bar of soap is appreciable asymmetry and may have a poor appearance. An excessive difference in shape between the two splits can make molding difficult and make production of the mold complicated. Hence, the inventors have ascertained that a soap bar always holds to the first split 1A when the ratio of the surface area of the recess 11A of the first split 1A to that of the recess 11B of the second split 1B ranges from 52:48 to 66:34, preferably from 52:48 to 57:43. At that surface area ratio, the recesses 11A and 11B are not so greatly different in shape, that is, the asymmetry of the resulting soap bar is not appreciable.

In order for a soap bar to hold to the first split 1A more securely, the present inventors have found it advantageous that the surface roughness Ra of the recess 11B of the second split 1B is greater than that of the recess 11A of the first split 1A. As mentioned in JP-A-2002-121599 supra, a soap bar holds to a split having a reduced surface roughness Ra on the recess. Conversely, a soap bar holds to a split having an increased surface roughness Ra on the recess owing to the anchor effect. That is, which split a soap bar holds to varies depending on the surface roughness Ra of the splits. As a result of extensive investigation, the present inventors have confirmed that a soap bar clings to the first split 1A with a smaller surface roughness Ra more securely when the difference in surface roughness Ra between the recess 11A of the first split 1A and the recess 11B of the second split 1B preferably falls within a range of from 0.1 to 30 μm, more preferably from 0.2 to 20 μm.

In the present embodiment, the surface roughness Ra of the recess 11B of the second split 1B is made larger than that of the recess 11A of the first split 1A as follows. Both the inner surfaces of the recesses 11A and 11B of the first and the second splits 1A and 1B are mirror-finished to become small surface roughness regions having nearly equal small surface roughness. The bottom of the recess 11B of the second split 1B is then roughened to become a large surface roughness region. The surface roughening is carried out by, for example, sandblasting.

As illustrated in FIG. 1, the large surface roughness region of the second split 1B is the bottom of the recess 11B. Namely, the large surface roughness region is substantially parallel to the parting face PL of the split mold. With that configuration, a soap bar is released from the second split 1B more easily and held in the first split 1A more securely. The term "substantially parallel" does not mean that the recess 11B should have a flat bottom. The bottom may be curved to give a soap bar a curved surface as is common to soap bars.

In order for a soap bar to hold to the first split 1A more securely, it is preferred that the large surface roughness region of the recess 11B of the second split 1B be 30% or more, more preferably 50% or more, of the total surface area of the recess 11B. It is even more preferred that the entire surface of the recess 11B be the large surface roughness region.

In order for a soap bar to hold to the first split 1A more securely, it is preferred that the large surface roughness region of the recess 11B of the second split 1B have a surface roughness Ra of 0.2 to 30 μm, more preferably 0.4 to 20 μm. The small surface roughness region of the recess 11B of the second split 1B and the recess 11A of the first split 1A both preferably have a surface roughness Ra of 0.1 to 30 μm, more preferably 0.1 to 20 μm. The small surface roughness region in the recess 11B of the second split 1B and the recess 11A of the first split 1A do not always need to have the same surface roughness Ra. Taking the cost of producing the splits 1A and 1B into consideration, nevertheless, the splits 1A and 1B are ordinarily mirror-polished under the same conditions. In view of this, it is natural that the small surface roughness region in the recess 11B of the second split 1B and the recess 11A of the first split 1A should have nearly equal surface roughness Ra as mentioned above.

In order for a soap bar to hold to the first split 1A more securely, it is preferred that the ratio of the surface roughness Ra of the large surface roughness region in the recess 11B of the second split 1B to that in the recess 11A of the first split 1A be in a range of from 1.003 to 300, more preferably of from 1.01 to 100.

Surface roughness Ra is measured in accordance with JIS B0601 with, for example, SURFCOM 590A, a surface roughness meter available from Tokyo Seimitsu Co., Ltd.

Figures 2A, 2B, 2C, 2D:
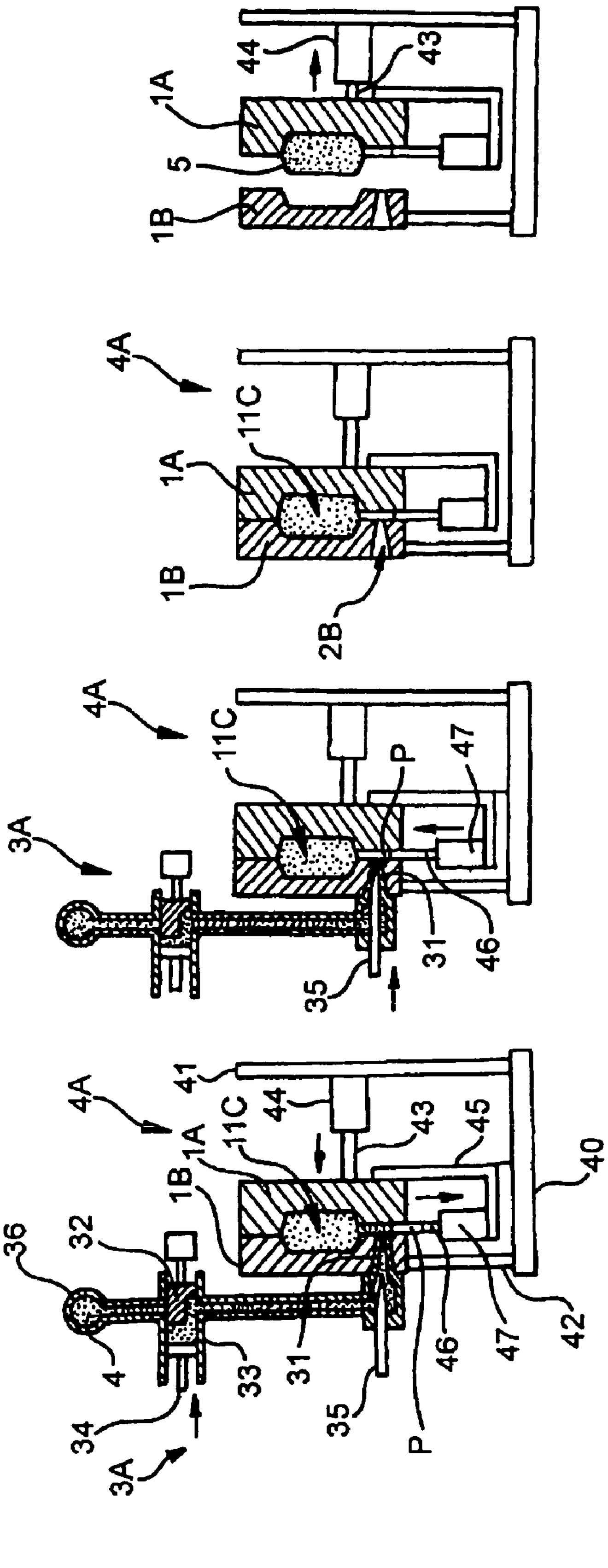
FIG. 2(*a*), FIG. 2(*b*), FIG. 2(*c*), and FIG. 2(*d*) schematically illustrate the method of producing a bar of aerated soap using the mold shown in FIG. 1.

The method of producing a soap bar using the mold shown in FIG. 1 will then be described with reference to FIG. 2 talking production of aerated soap bars for instance. The mold shown in FIG. 1 is used as assembled into the apparatus illustrated in FIG. 2. The apparatus has a mold unit 4A and an injection section 3A for the molten soap. The mold is mounted on a base plate 40 of the mold unit 4A as illustrated in FIG. 2(*a*). On the base plate 40 are vertically set a support plate 41 supporting the first split 1A and a support plate 42 supporting the second split 1B. A cylinder 44 having a piston 43 is attached to the inner side of the support plate 41 such that the piston 43 slides in the direction perpendicular to the support plate 41. The tip of the piston 43 is fixed to the back of the first split 1A. Accordingly, the first split 1A is a horizontally movable part. The first split 1A is set with the gate 2A positioned below the cavity. An L-shaped support plate 45 supporting a cylinder 47 is attached to the lower part of the back of the first split 1A. The cylinder 47 having a piston 46 is fixed to the horizontal part of the support plate 45 such that the piston 46 may vertically slide. The tip of the piston 46 is connected to the gate pin P of the first split 1A.

The second split 1B is attached to the support plate 42 with its recess 11B facing the recess 11A of the first split 1A and with the nozzle insert port 2B facing horizontal direction. As is apparent from FIG. 2(*a*), the second split 1B is a stationary part. The back side of the second split 1B connects to the injection section 3A for the molten soap. The injection section 3A has an injection nozzle 31, a switchover valve 32, a cylinder 33, and a piston 34 in the cylinder 33. The injection nozzle 31 is shaped to the inner shape of the nozzle insert port 2B pierced through the second split 1B and is inserted into the nozzle insert port 2B. A plug 35 is slidably inserted through the inside of the injection nozzle 31. The plug 35 extends and retracts to control the feed of molten soap from the injection nozzle 31 to the cavity. The switchover valve 32 is designed so that the cylinder 33 may connect to either a circulation duct 36 passing through a molten soap storage tank (not shown) or the injection nozzle 31. In the state shown in FIG. 2(*a*), the cylinder 33 connects to the injection nozzle 31, with the connection to the circulation duct 36 shut.

The method of making a bar of aerated soap by the use of the apparatus shown in FIG. 2 will be described. The cylinder 44 of the mold unit 4A operates to push the piston 43 forward thereby to join the first split 1A to the second split 1B. The two splits have water circulated in the above-described respective passageways for cooling water circulation. The cylinder 47 operates to retract the piston 46 thereby to partly withdraw the gate pin P attached to the piston 46 from the first split 1A. In the injection section 3A, on the other hand, with the piston 34 extending, the switchover valve 32 operates to interconnect the cylinder 33 and the circulation duct 36. The piston 34 then retracts to draw a predetermined amount of molten soap into the cylinder 33. The molten soap stored in the storage tank (not shown) is circulating through the circulation duct 36 to make a loop passing through the storage tank. The circulating molten soap is delivered to the cylinder 33 by switching over the flow by the switchover valve 32. By this circulation the molten soap is effectively prevented from separating into gas and liquid. Molten soap having countless air bubbles dispersed therein can be prepared by, for example, the process described in commonly owned JP-A-11-43699, col. 2, 1. 15 to col. 5, 1. 1. Various gases are useful for bubbling molten soap. In particular, an inert gas, especially a non-oxidizing inert gas such as nitrogen gas, is effective to prevent the molten soap components from being deteriorated or oxidatively decomposed on heating to generate offensive odors.

The switchover valve 32 operates to shut the connection between the cylinder 33. and the circulation duct 36 and to connect the cylinder 33 and the injection nozzle 31 as illustrated in FIG. 2(*a*). The plug 35 is at the retracted position. Subsequently, the piston 34 extends. As a result, the molten soap 4 is extruded from the cylinder 33 and injected under pressure into the cavity 11C through the injection nozzle 31 and the gate 2A (see FIG. 1). By the injection under pressure, the molten soap in the cavity 11C is compressed to a predetermined volume.

After a predetermined amount of the molten soap is injected, the plug 35 is inserted in to shut the interconnection between the injection nozzle 31 and the cavity 11C, as shown in FIG. 2(*b*). The cylinder 47 operates to push the piston 46 to press the gate pin P connected to the piston 46 into the gate 2A (see FIG. 1), whereby the molten soap remaining in the gate 2A is injected into the cavity 11C.

The mold unit 4A is then withdrawn (moved to the right in FIG. 2) so that the injection section 3A separates from the second split 1B as shown in FIG. 2(*c*). Meantime, the molten soap in the cavity 11C is cooled to solidify in the compressed state. As previously described, each of the splits 1A and 1B has already been cooled to a prescribed temperature by the circulating cooling water, whereby solidification of the molten soap in the cavity 11C is accelerated. Since the molten soap has been injected under pressure and compressed, it is prevented from shrinking or developing sink marks during solidification by cooling.

After solidification of the molten soap, the cylinder 44 operates to withdraw the piston 43 to separate the mold into the splits 1A and 1B as shown in FIG. 2(*d*). The solidified soap bar 5 in the cavity is then taken out with a prescribed means for handling (not shown). The soap bar 5 is always held in the first split 1. Therefore, removal of the soap bar 5 with handling means is always from the first split 1A so that removal from the mold is easily carried out to improve the productivity. Moreover, since a soap bar never drops when the mold is opened, the equipment is prevented from being contaminated with chips of fallen soap. While the recesses 11A and 11B of the splits 1A and 1B are asymmetrical to each other, they have no undercuts, and there is no need to forcedly withdraw the soap from the splits.

When to open the mold after solidification of molten soap by cooling is not particularly limited, but for ensuring that the soap is held in the first split 1A, it is recommended to open the mold earlier than after the solidification has completed in the inside of the soap, for example, after the outer surface has solidified while the inside has not.

Figure 3:
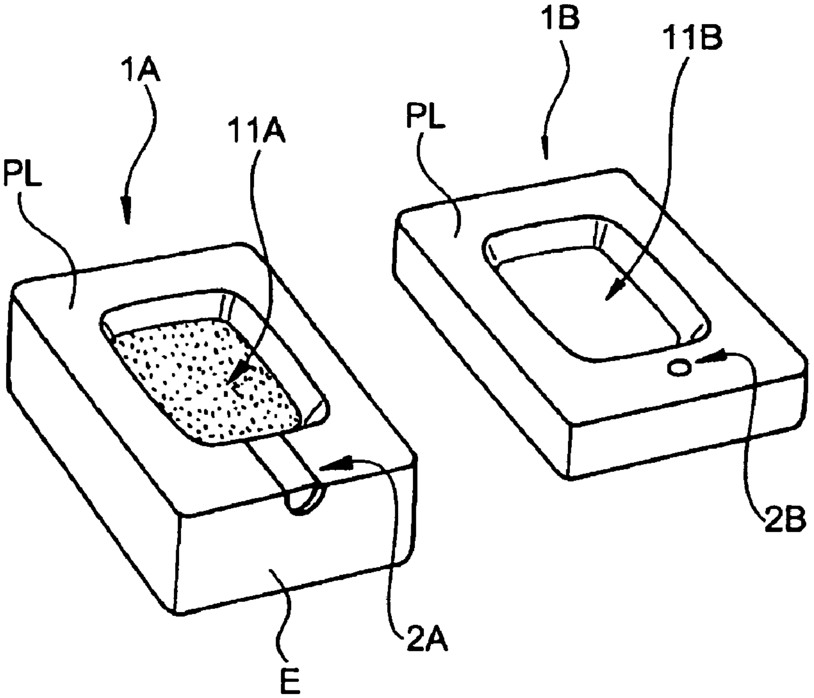
FIG. 3, which corresponds to FIG. 1, is a perspective of another embodiment of a soap mold according to the present invention.

Another embodiment of the present invention will be described by referring to FIG. 3. The description of the first embodiment applies appropriately to those particulars that are not referred to here. Reference numerals common to FIGS. 1 and 3 represent the same elements. The mold illustrated in FIG. 3 has almost the same configuration as the mold of FIG. 1. The difference is that the recesses 11A and 11B of the mold of this second embodiment are substantially symmetrical in shape to each other.

The splits 1A and 1B have their recesses 11A and 11B mirror-polished to provide respective small surface roughness regions, except that the bottom of the recess 11A of the first split 1A is roughened after the mirror polishing to become a large surface roughness region. That is, in the second embodiment, the recess 11A of the first split 1A has a larger surface roughness Ra than the recess 11B of the second split 1B.

The recess 11A of the first split 1A has a large surface roughness region and a small surface roughness region, whereas the recess 11B of the second split 1B has only a small surface roughness region. The surface roughness Ra of the small surface roughness region in the recess 11A of the first split 1A is nearly equal to that of the small surface roughness region of the recess 11B of the second split 1B.

As a result of study, the present inventors have found that, where the surface roughness Ra of the recess 11A of the first split 1A is larger than that of the recess 11B of the second split 1B, a soap bar obtained by filling the cavity with molten soap and cooling the molten soap to solidify is always held in the second split 1B when the split mold is opened.

As stated previously, a soap bar holds to a split having a reduced surface roughness Ra on the recess and, conversely, a soap bar holds to a split having an increased surface roughness Ra on the recess owing to the anchor effect. That is, which split a soap bar holds to varies depending on the surface roughness Ra of the splits. As a result of extensive investigation, the present inventors have confirmed that a soap bar always holds to the second split 1B with a smaller surface roughness Ra when the difference in surface roughness Ra between the recess 11A of the first split 1A and the recess 11B of the second split 1B falls within a range of from 0.1 to 30 μm, preferably from 0.2 to 20 μm.

As illustrated in FIG. 3, the large surface roughness region of the first split 1A is the bottom of the recess 11A. Namely, the large surface roughness region is substantially parallel to the parting face PL of the split mold. That configuration allows for easier removal of a soap bar from the first split 1A and for the soap bar remaining in the second split 1B more securely. The term "substantially parallel" is as defined above.

In order for a soap bar to hold to the second split 1B more securely, it is preferred that the large surface roughness region of the recess 11A of the first split 1A be 30% or more, more preferably 50% or more, of the total surface area of the recess 11A. It is even more preferred that the entire surface of the recess 11A be the large surface roughness region.

In order for a soap bar to hold to the second split 1B more securely, it is preferred that the large surface roughness region of the recess 11A of the first split 1A have a surface roughness Ra of 0.2 to 30 μm, more preferably 0.4 to 20 μm. The small surface roughness region in the recess 11A of the first split 1A and that in the recess 11B in the second split 1A both preferably have a surface roughness Ra of 0.1 to 30 μm, more preferably 0.1 to 20 μm. The small surface roughness region in the recess 11A of the first split 1A and that in the recess 11B of the second split 1B do not always need to have the same surface roughness Ra.

In order for a soap bar to hold to the second split 1B more securely, it is preferred that the ratio of the surface roughness Ra of the large surface roughness region in the recess 11A of the first split 1A to that in the recess 11B of the second split 1B be in a range of from 2 to 300, more preferably of from 4 to 200.

In the manufacture of soap bars using the apparatus illustrated in FIG. 2 in which the mold of the second embodiment is assembled, when the splits 1A and 1B are separated after molding soap in the mold, the soap 5 is always held in the second split 1B.

The present invention is not limited to the foregoing embodiments. For example, while in the foregoing embodiments a set of two splits makes one split mold, a mold may be composed of three or more splits. In that case, it is preferred that one of the splits has a larger surface area in its recess than any of the other splits. Alternatively, it is preferred that one of the splits has a larger surface roughness in at least part of the recess thereof than any of the other splits and that the other splits have the same surface roughness in their recesses.

While in the embodiment shown in FIG. 1 a large surface roughness region is formed in the bottom of the recess of the second split 1B, the large surface roughness region is not essential to the embodiment. The recesses 11A and 11B of the splits 1A and 1B may both have nearly equal small surface roughness.

While in the embodiments shown in FIGS. 1 and 3 the large surface roughness region is formed on the recess's bottom that is substantially parallel to the parting face PL, the place of forming a large surface roughness region is not limited to the bottom. A large surface roughness region may be formed on the other part of a recess, for example, a face almost perpendicular to the parting face PL. When a large surface roughness region is formed on the bottom of a recess, the large surface roughness region may be formed either continuously all over the bottom or discontinuously in parts.

For the purpose of helping a soap bar hold to the first split and release from the second split, a slit or small hole open to the recess 11A of the first split 1A or the recess 11B of the second split 1B may be made to allow for air suction or air ejection therethrough. Similarly, in the embodiment shown in FIG. 3, for the purpose of helping a soap bar hold to the second split and release from the first split, a slit or small hole open to the recess 11A of the first split 1A or the recess 11B of the second split 1B may be made to allow for air suction or air ejection therethrough.

While in the aforementioned embodiments the mold of the present invention is applied to the production of an aerated soap bar, which is categorized as compression molding, the mold of the invention is useful in the production of bubble-free soap bars. Nevertheless, the mold of the invention is especially suited for use in compression molding including production of aerated soap that largely shrinks on cooling.

The present invention will now be illustrated in greater detail with reference to Examples, but it should be understood that the invention is not construed as being limited thereto. Unless otherwise noted, all the parts are by weight.

EXAMPLE 1-1

Bars of aerated soap were made using the apparatus of FIG. 2 having the mold of FIG. 1 installed therein. The ratio of the surface area of the first split's recess to that of the second split's recess was 53:47. The recess of each split was mirror polished to form a small surface roughness region having a surface roughness Ra of 0.463 μm. The bottom of the recess of the second split was roughened by sandblasting to form a large surface roughness region having a surface roughness Ra of 18.93 μm. The large surface roughness region in the recess of the second split was 48% of the total surface area of the recess.

Molten soap having a great number of air bubbles dispersed therein was prepared from the following compounding ingredients in accordance with the process described in JP-A-11-43699 supra. Nitrogen gas was used for bubbling.

| | |
|---|---|
| Sodium laurate | 30 parts |
| Sodium cocoyl isethionate | 2 parts |
| Sodium lauroyl lactate | 5 parts |
| Polyoxyethylene monolaurate | 2 parts |
| Lauric acid | 5 parts |
| Glycerin | 20 parts |
| Sodium chloride | 1.5 parts |
| Fragrance | 1.5 parts |
| Water | 32 parts |

Bars of aerated soap were made using the prepared molten soap in accordance with the steps depicted in FIGS. 2(*a*) through 2(*d*). The temperature of the molten soap was 64° C. Each split of the mold had been cooled with cooling water at 5° to 15° C. The time of cooling the injected molten soap was 1 minute. After the cooling time, the mold was opened to see which split the bar held to. Five molding cycles were run. It was confirmed that the bar held to the first split in every molding cycle.

EXAMPLE 1-2

Bars of aerated soap were made in the same manner as in Example 1-1 with the following exception. The first split to second split ratio of recess's surface area was 57:43. The recess of each split was mirror polished to form a small surface roughness region having a surface roughness Ra of 0.263 μm. The bottom of the recess of the second split was roughened by sandblasting to form a large surface roughness region having a surface roughness Ra of 0.463 μm. Five molding cycles were run. It was confirmed that the bar held to the first split in every molding cycle.

EXAMPLE 1-3

Bars of aerated soap were made in the same manner as in Example 1-1 with the following exception. The first split to second split ratio of recess's surface area was 66:34. The recess of each split was mirror polished to form a small surface roughness region having a surface roughness Ra of 0.263 μm. The bottom of the recess of the second split was roughened by sandblasting to form a large surface roughness region having a surface roughness Ra of 18.93 μm. Five molding cycles were run. It was confirmed that the bar held to the first split in every molding cycle.

EXAMPLES 1-4 TO 1-6

Bars of aerated soap were made in the same manner as in Examples 1-1 to 1-3, except that the large surface roughness region was not formed in the second split. Five molding cycles were run per Example. It was confirmed that the bar held to the first split in every molding cycle.

EXAMPLE 2-1

Bars of aerated soap were made using the apparatus of FIG. 2 having the mold of FIG. 3 installed therein. The recess of each split was mirror polished to form a small surface roughness region having a surface roughness Ra of 0.463 μm. The bottom of the recess of the first split was roughened by sandblasting to form a large surface roughness region having a surface roughness Ra of 18.93 μm. The large surface roughness region in the recess of the first split was 48% of the total surface area of the recess.

Molten soap having a great number of air bubbles dispersed therein was prepared from the following compounding ingredients in accordance with the process described in JP-A-11-43699 supra. Nitrogen gas was used for bubbling.

| | |
|---|---|
| Sodium laurate | 30 parts |
| Sodium cocoyl isethionate | 2 parts |
| Sodium lauroyl lactate | 5 parts |
| Polyoxyethylene monolaurate | 2 parts |
| Lauric acid | 5 parts |
| Glycerin | 20 parts |
| Sodium chloride | 1.5 parts |
| Fragrance | 1.5 parts |
| Water | 32 parts |

Aerated soap bars were made using the prepared molten soap in accordance with the steps depicted in FIGS. 2(*a*) through 2(*d*). The temperature of the molten soap was 64° C. Each split of the mold had been cooled with cooling water at 5° to 15° C. The time of cooling the injected molten soap was 1 minute. After the cooling time, the mold was opened to see which split the bar held to. Five molding cycles were run. It was confirmed that the bar held to the second split in every molding cycle.

EXAMPLE 2-2

Bars of aerated soap were made in the same manner as in Example 2-1, except that the recess of each split was mirror polished to form a small surface roughness region having a surface roughness Ra of 0.263 μm and that the bottom of the recess of the first split was roughened by sandblasting to form a large surface roughness region having a surface roughness of 0.463 μm. Five molding cycles were run. It was confirmed that the bar held to the second split in every molding cycle.

EXAMPLE 2-3

Bars of aerated soap were made in the same manner as in Example 2-1, except that the recess of each split was mirror polished to form a small surface roughness region having a surface roughness Ra of 0.263 μm and that the bottom of the recess of the first split was roughened by sandblasting to form a large surface roughness region having a surface roughness of 18.93 μm. Five molding cycles were run. It was confirmed that the bar held to the second split in every molding cycle.

COMPARATIVE EXAMPLE 1

Bars of aerated soap were made in the same manner as in Example 1-1 with the following exception. The recess of the first split and the recess of the second split were symmetric to each other and had the same surface area. The large surface roughness region was not formed in the second split. When ten molding cycles were run, four bars out of ten held to the first split, and the other six bars held to the second split.

INDUSTRIAL APPLICABILITY

The split mold of the present invention always holds a molded bar of soap in its specific split when opened. Therefore, using the mold of the present invention allows for stable production of soap bars with high productivity. The mold of the present invention is especially suited to compression molding as in the production of aerated soap bars.

The invention claimed is:

1. A soap making mold, comprising:

a set of splits adapted to be assembled together to form a molding cavity in an inside of the mold, each of the splits having a recess defining part of the cavity, wherein one of the splits has a larger surface area in the recess thereof than any of the other splits has in the recess thereof, a ratio of the surface area of the recess of the one of the splits to that of any of the other splits ranges from 52:48 to 66:34, a difference of a surface roughness Ra of the recess of the one of the splits and a surface roughness Ra of the recess of any of the other splits is 0.1 to 30 μm, and neither of the recesses includes an undercut.

2. The soap making mold according to claim 1, wherein the set of splits consists of two splits.

3. The soap making mold according to claim 1, wherein the surface roughness Ra of the recesses of any of the other splits is larger than the surface roughness Ra in the recess of the one of the splits.

4. The soap making mold according to claim 3, wherein each of the other splits has a large surface roughness region and a small surface roughness region in the recess thereof, the small surface roughness region having a surface roughness Ra that is substantially equal to the surface roughness Ra of the recess of the one of the splits.

5. The soap making mold according to claim 4, wherein the recess of any of the other splits has a face substantially parallel to a parting face of the mold, and the large surface roughness region is formed on the face.

6. The soap making mold according to claim 4, wherein the large surface roughness region of the recess in each of the other splits is at least 30% of the total surface area of the recess.

7. The soap making mold according to claim 4, wherein the large surface roughness region of each of the other splits has a surface roughness Ra of 0.2 to 30 μm, and the small surface roughness region of each of the other splits and the recess of the one of the splits both have a surface roughness Ra of 0.1 to 30 μm.

8. A soap making mold, comprising:

a set of splits adapted to be assembled together to form a molding cavity in an inside of the mold, each of the splits having a recess defining part of the cavity, wherein one of the splits has a larger surface roughness Ra in the recess thereof than any of the other splits has in the recess thereof, and a difference of the surface roughness Ra of the recess of the one of the splits and the surface roughness Ra of the recess of any of the other of the splits is 0.1 to 30 μm.

9. The soap making mold according to claim 8, wherein the one of the splits has a large surface roughness region and a small surface roughness region in the recess thereof, the small surface roughness region having a surface roughness Ra that is substantially equal to the surface roughness Ra of the recess of each of the other splits.

10. The soap making mold according to claim 9, wherein the recess of the one of the splits has a face substantially parallel to a parting face of the mold, and the large surface roughness region is formed on the face.

11. The soap making mold according to claim 9, wherein the large surface roughness region of the recess in the one of the splits is at least 30% of a total surface area of the recess.

12. The soap making mold according to claim 9, wherein the large surface roughness region of the one of the splits has a surface roughness Ra of 0.2 to 30 μm, and the small surface roughness region of the one of the splits and the recess of each of the other splits both have a surface roughness Ra of 0.1 to 30 μm.

13. The soap making mold according to claim 8, wherein the set of splits consists of two splits, and the recesses of the two splits are substantially symmetrical to each other.

14. The soap making mold according to claim 8, wherein neither of the recesses includes an undercut.

* * * * *